United States Patent [19]
Swanson

[11] Patent Number: 5,596,144
[45] Date of Patent: Jan. 21, 1997

[54] PIEZORESISTIVE FORCE REBALANCE ACCELEROMETER

[75] Inventor: Gregory D. Swanson, Indianapolis, Ind.

[73] Assignee: Delco Electronics Corporation, Kokomo, Ind.

[21] Appl. No.: 511,215

[22] Filed: Aug. 4, 1995

[51] Int. Cl.⁶ .......................... G01P 15/12; G01P 15/125
[52] U.S. Cl. ...................... 73/514.18; 73/514.33; 73/862.61; 73/514.17
[58] Field of Search .............. 73/514.17, 514.18, 73/514.32, 514.33, 514.34, 862.61, 862.627; 338/2, 5

[56] References Cited

U.S. PATENT DOCUMENTS

| | | | |
|---|---|---|---|
| 5,121,180 | 6/1992 | Beringhause et al. | 73/514.34 |
| 5,163,325 | 11/1992 | White et al. | 73/514.33 |
| 5,177,331 | 1/1993 | Rich et al. | 73/514.18 |
| 5,233,213 | 8/1993 | Marek | 73/514.33 |
| 5,391,283 | 2/1995 | Shimada et al. | 73/514.18 |

FOREIGN PATENT DOCUMENTS

| | | | |
|---|---|---|---|
| 2-194362 | 7/1990 | Japan | 73/514.33 |

*Primary Examiner*—Hezron E. Williams
*Assistant Examiner*—Helen Kwok
*Attorney, Agent, or Firm*—Jimmy L. Funke

[57] ABSTRACT

A motion sensor is provided for sensing motion or acceleration of a body, such as an accelerometer for use in an on-board automotive safety control system or navigational system. The motion sensor is a piezoresistive motion sensor that operates in a closed loop force rebalance mode. As such, the motion sensor may be considered a hybrid of piezoresistive sensors and capacitive force rebalance sensors. The sensor achieves this novel combination through a mechanically-biased proof mass that enables-the use of a single electrode for maintaining the proof mass in a null position during the operation of the sensor.

18 Claims, 1 Drawing Sheet

PIEZORESISTIVE FORCE REBALANCE ACCELEROMETER

This invention generally relates to motion sensors, and particularly to those which sense acceleration through piezoresistive sensing technology. More specifically, this invention relates to a piezoresistive accelerometer that combines piezoresistive sensing technology with electrostatic deflection technology to yield a closed loop piezoresistive force rebalance accelerometer characterized by operational advantages associated with each technology.

BACKGROUND OF THE INVENTION

Motion sensors and accelerometers are widely used in aerospace and automotive safety control systems and navigational systems, such as crash sensing systems. Automotive applications include anti-lock braking systems, active suspension systems, theft deterrent systems, supplemental inflatable restraint systems such as air bags, and seat belt lock-up systems. An example of a type of motion sensor employed in automotive systems is an acceleration sensor, or accelerometer, which senses acceleration, or more accurately, a force resulting from a change in the velocity of the vehicle. As with many motion sensors, an accelerometer operates on the basis of a moving body possessing inertia which tends to resist a change in velocity.

In the past, various types of electromechanical and electronic accelerometers have been used in the automotive industry to detect a change in an automobile's velocity. One type that has found wide acceptance in the industry is the piezoresistive accelerometer. Such accelerometers are generally composed of a silicon chip that has been micromachined to form a proof mass supported by one or more beams or bridges. Piezoresistors are formed on the bridge or bridges, and utilize the anisotropic piezoresistive characteristic of silicon to produce a change in resistance in response to strain induced in the bridges by the deflection of the proof mass. Piezoresistive accelerometers have a high transduction scale factor and offer a high degree of precision. Furthermore, they can be fabricated in a manner that is compatible with integrated circuit processing techniques, and are therefore widely used in the automotive industry.

The piezoresistors must be wired to suitable circuitry in order for their output to be employed to indicate acceleration. A conventional circuit for this purpose is a Wheatstone bridge. Four identical piezoresistors are typically used, with each piezoresistor forming a different leg of the bridge. In this fashion, the voltage measured across each resistor in each leg is half of the power supply to the bridge, and the differential between the two sides of the bridge, serving as the output of the circuit, is zero. Deflections of the proof mass are sensed by a change in resistance of the piezoresistors due to strains in the one or more bridges supporting the proof mass, causing a differential voltage signal to be present at the output of the Wheatstone bridge circuit. This output is proportional to the acceleration forces on the proof mass.

With the above design, it is often desirable or necessary to provide physical damping of the proof mass in order to achieve a damped electrical response to acceleration over frequency. A basic damping technique is squeeze film air damping, which is accomplished by creating a sealed cavity surrounding the proof mass with two or more additional chips that sandwich the proof mass chip.

Another type of accelerometer that has found acceptance in the automotive industry is the capacitive accelerometer, whose transduction method is that of a differential capacitor. Such accelerometers are generally formed by bulk etching a silicon chip, as noted above for piezoresistive accelerometers, or by surface micromachining techniques. In this design, a proof mass is supported by one or more bridges so as to be equidistant between a pair of capacitor electrodes when at a null position. These electrodes are typically formed by upper and lower capping chips that are bonded to opposite sides of the proof mass chip. The proof mass forms a third electrode, such that any deflection of the proof mass causes a change in the differential capacitance between the proof mass and the other two other electrodes, yielding an accelerometer output that is proportional to the acceleration forces on the proof mass. As with the piezoresistive accelerometer, the upper and lower capping chips can be used to form a sealed cavity around the proof mass so as to simultaneously provide squeeze film air damping for the proof mass.

Both the piezoresistive and capacitive accelerometers described above operate in an open loop manner, in that their response to acceleration produces an output that is directly measured in order to determine an acceleration force. A disadvantage with such accelerometers is that each employs a proof mass that must be deflected in order to produce an output, and therefore are often constructed so as to provide squeeze film air damping for the proof mass.

A solution to the above has been to further limit the movement of the proof mass within the cavity using a force rebalance technique which virtually prevents movement of the proof mass. This technique, represented in FIG. 1, has been employed with capacitive accelerometers, and utilizes an appropriate feedback circuitry 36 to detect the movement, indicated by arrows 32, of a proof mass 20 that is cantilevered from a frame 18 of the accelerometer 10. In the example, movement of the proof mass 20 toward an upper electrode 28a and away from a lower electrode 28b causes a change in capacitance between the proof mass 20 and the opposing electrodes 28a and 28b, causing a differential capacitance between the proof mass 20 and the electrodes 28a and 28b. The feedback circuitry 36 then applies a potential difference between the proof mass 20 and the electrode 28b, thereby creating an electrostatic force 30 that forces the proof mass 20 back to its null position. In this manner, the voltage-required to return and maintain the proof mass 20 at its null position is proportional to the acceleration force on the proof mass 20, and therefore serves as the output to the accelerometer 10.

A major advantage with this approach is that squeeze film air damping is not necessary since the proof mass 20 essentially does not move. As such, the cavity 24 need not be sealed, but can be vented to atmosphere. Another benefit is that, since the proof mass 20 does not move, the bridges supporting the proof mass 20 are not susceptible to fatigue. Finally, the use of the electronic feedback circuitry 36 can provide for a frequency response that is independent of the geometry of the accelerometer 10 and its proof mass 20, and that can be tailored to a specific application range.

Though the above noted advantages are significant, certain difficulties exist with the force rebalance accelerometers of the type described above. A primary difficulty is in fabricating a sensor that requires the capability of electrostatic deflection on both sides of the proof mass 20, necessitating electrical contacts to all three chips 12, 14 and 16. Secondly, the requirement for three separate chips 12, 14 and 16 increases the package size of the accelerometer 10. Another significant drawback is that the transduction scale factor for a capacitive sensor is relative low. As such, the feedback circuitry 36 for the capacitive accelerometer 10 must be provided on the same chip as the accelerometer 10 in order to avoid the use of connections that create parasitic capacitance, which would add to the noise of the system and degrade the output of the accelerometer. Such a requirement adds significant costs related to complex processing and higher yield losses, which are highly undesirable if the accelerometer is to be mass-produced. Another notable drawback is that the gap widths between the proof mass 20 and the electrodes 28a and 28b must be controlled to precise tolerances, since differences in gap widths will effect the operation of the accelerometer and its feedback circuitry 36.

Therefore, what is needed is a motion sensor that has the advantageous operational characteristics of a force rebalance motion sensor, but does not have the processing disadvantages or noise susceptibility of capacitive force rebalance accelerometers. Specifically, it would be desirable if such an accelerometer had a proof mass that is virtually immobilized in a manner that does not require squeeze film air damping or electrostatic balancing on both sides of the proof mass, were capable of fabrication with less than three separate electrical contacts and three chips, and enabled its control circuitry to be provided on a chip separate from the accelerometer.

SUMMARY OF THE INVENTION

It is an object of the present invention to provide a cost-efficient motion sensor that is suitable for use in automotive applications and is amenable to automotive mass production techniques.

It is another object of this invention that such a motion sensor employ a proof mass that is subject to acceleration forces imposed on the motion sensor.

It is a further object of this invention that the motion sensor be configured to operate as a force rebalance sensor, such that the proof mass virtually does not move in response to an input force.

It is still a further object of this invention that such a motion sensor does not require three separate chips, a sealed cavity within which the proof mass is suspended, and electrostatic balancing on both sides of the proof mass, such that the motion sensor can be manufactured using processing and fabrications methods that are less costly and more amenable to mass production.

In accordance with a preferred embodiment of this invention, these and other objects and advantages are accomplished as follows.

A motion sensor is provided for sensing motion or acceleration of a body, such as an accelerometer for use in an on-board automotive safety control system or navigational system. In particular, the motion sensor is a piezoresistive motion sensor that operates in a closed loop force rebalance mode. As such, the motion sensor may be considered a hybrid of prior art piezoresistive sensors and capacitive force rebalance sensors. However, the sensor of this invention achieves this novel combination through the unique use of a mechanically-biased proof mass, enabling the use of a single electrode for maintaining the proof mass in a null position during the operation of the sensor.

The motion sensor of this invention includes a proof mass having a first electrode, and a second electrode disposed adjacent the first electrode so as to form a gap therebetween. The proof mass is supported so as to be subject to acceleration forces imposed on the motion sensor. The motion sensor further includes a deflection element that biases the proof mass in a direction away from the second electrode, such that the proof mass is deflected away from the second electrode in a de-energized state of the motion sensor. The second electrode is adapted to electrostatically attract the proof mass in a direction toward the second electrode while the motion sensor is in an energized state, such that a null position is established for the proof mass in the energized state. Finally, the motion sensor includes a sensing element, preferably one or more piezoresistors, that is capable of sensing strain induced by a deflection of the proof mass relative to the second electrode and producing an output signal based on the strain.

In accordance with the above structure, the tendency for the proof mass to be deflected away from the second electrode counteracts the electrostatic attraction force between the proof mass and the second electrode in the energized state. This counteraction establishes the null position for the proof mass relative to the second electrode in the energized state. The motion sensor can then be connected to control circuitry capable of generating an electrostatic force with the second electrode based on the output signal of the strain sensing element. The control circuitry serves to maintain the proof mass at its null position while the accelerometer is energized and subject to dynamic input such as acceleration forces, and therefore yields a force rebalance sensor whose output is based on the potential necessary to maintain the proof mass at null.

From the above, it can be seen that the motion sensor of this invention does not require electrostatic balancing on both sides of the proof mass, but only on a single side of the proof mass. This aspect of the invention greatly simplifies the fabrication of the sensor because only two electrical contacts are required within the sensor structure, making the sensor more amenable to mass production methods. As such, the sensor also does not require three separate chips. Only two chips are sufficient in the production of the sensor—a first from which the proof mass is fabricated, and a second for positioning the second electrode adjacent the proof mass. In addition, the motion sensor of this invention also does not require that the proof mass be enclosed within a sealed cavity, since the sensor operates as a force rebalance sensor, and therefore does not require squeeze film air damping of the proof mass. As a result, operation of the motion sensor can be verified by confirming that the proof mass moves to null when the voltage pre-established for attaining the null position (the bias voltage) is applied to the electrodes.

Each of the above advantages are achieved, while retaining the primary advantageous operating characteristics of a piezoresistive accelerometer. Specifically, the strain sensing capability of a piezoresistor offers a high transduction scale factor, yielding a high degree of precision, and the piezoresistor can be fabricated in a manner that is compatible with integrated circuit processing techniques. The high transduction scale factor enables for the control circuitry to be formed on a separate chip from those forming the proof mass and electrode.

The sensor of this invention also retains the advantageous operating characteristics of a capacitive force rebalance sensor, in that the proof mass is not required to move significantly in order to generate a suitable output. Such a configuration provides for a more durable sensor structure, since the structure supporting the proof mass is not subject to fatigue. Another important consideration is that any particulate contaminants that might migrate into the proof mass cavity are less likely to interfere with the operation of the sensor. In addition, the gap width between the proof mass and the second electrode is not required to be controlled to precise tolerances, since the bias voltage applied to the second electrode can be readily adjusted in order to attract the proof mass into a suitable null position. Finally, the use of the electronic control circuitry can provide for a frequency response that is independent of the geometry of the sensor and its proof mass, and that can be tailored for a specific range.

Other objects and advantages of this invention will be better appreciated from the detailed description thereof, which follows.

BRIEF DESCRIPTION OF THE DRAWINGS

The above and other advantages of this invention will become more apparent from the following description when taken in conjunction with the accompanying drawings, in which.

DETAILED DESCRIPTION OF THE PREFERRED EMBODIMENTS

Figure 1:
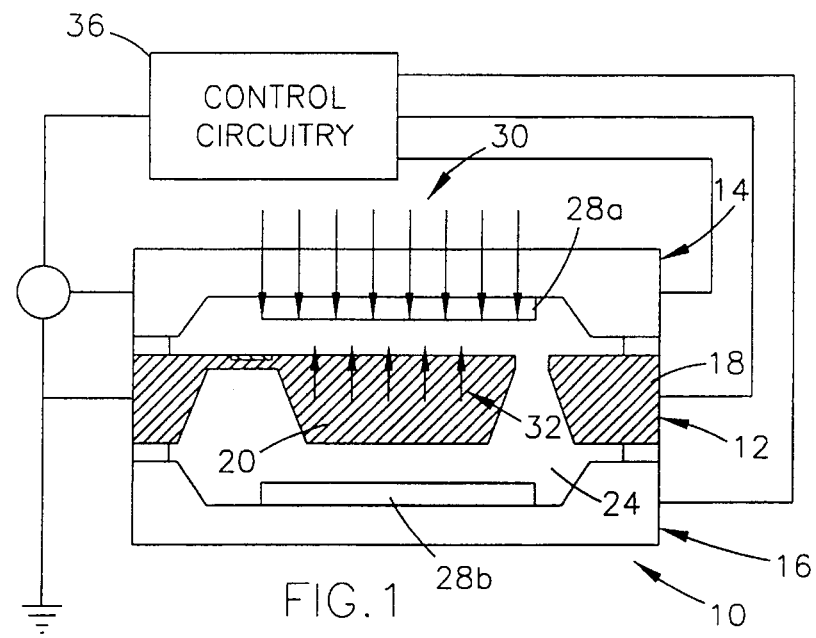
FIG. 1 is a cross-sectional view of a capacitive force rebalance motion sensor of a type known in the prior art.
Figure 2:
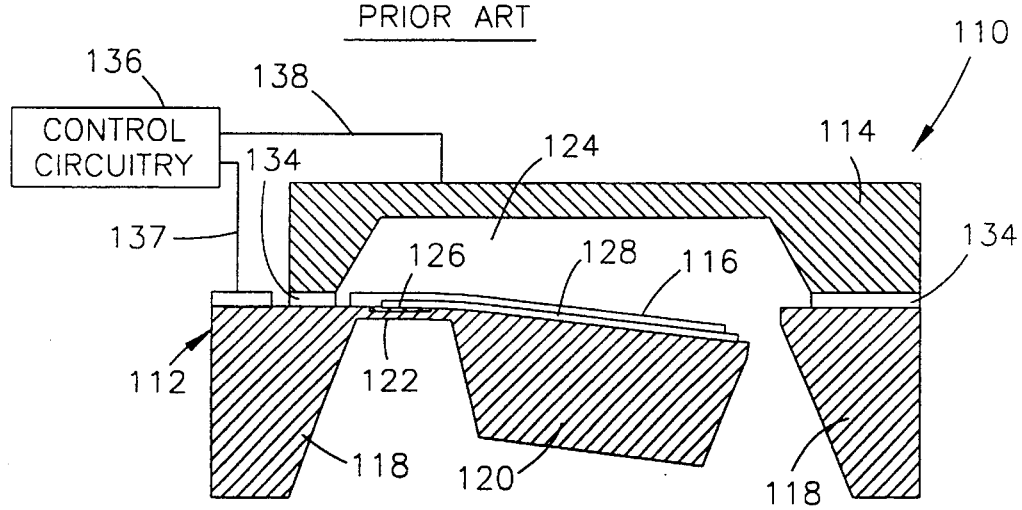
FIG. 2 is a cross-sectional view of a de-energized piezoresistive force rebalance motion sensor in accordance with the teachings of the present invention.
Figure 3:
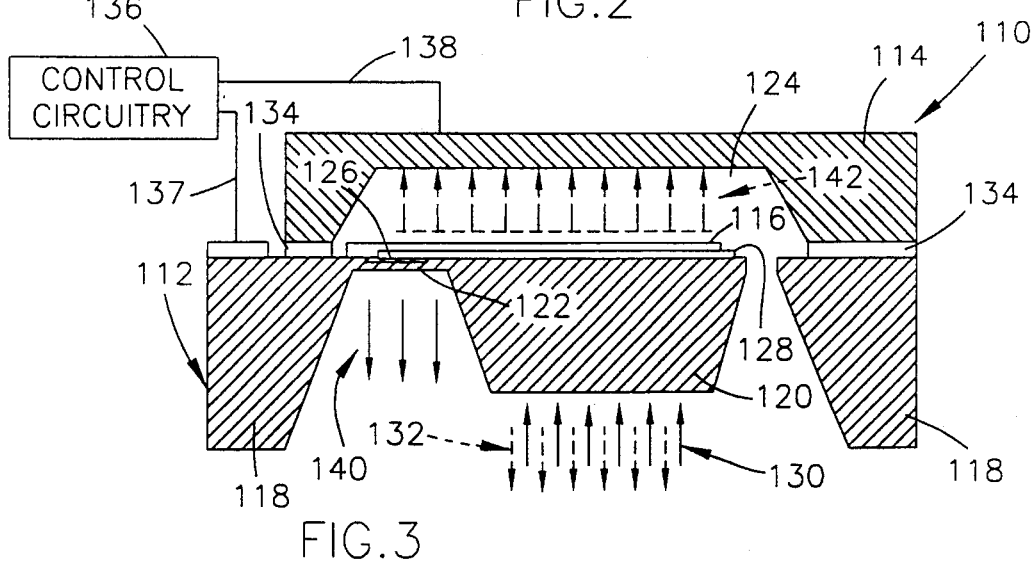
FIG. 3 is a cross-sectional view of the piezoresistive force rebalance motion sensor of FIG. 1, in which the motion sensor is energized so as to achieve a null position in accordance with the teachings of the present invention.

A motion sensor 110 in accordance with a preferred embodiment of this invention is illustrated in FIGS. 2 and 3. The external appearance and construction of the sensor 110 is somewhat similar to that of the prior art capacitive force rebalance motion sensor 10 previously described with reference to FIG. 1. However, significant differences exist between the motion sensor 110 and the motion sensor 10, with the most conspicuous differences being the absence of a third chip and a third electrode, the use of a mechanically-biased proof mass, and the use of piezoresistive technology for sensing the deflection of the proof mass.

With reference to FIG. 2, the motion sensor 110 of this invention is depicted in a de-energized state. The sensor 110 is preferably constructed from a pair of chips, one serving as a proof mass chip 112 and the second serving as an upper capping chip 114. Though a third chip could be employed as a bottom capping chip for the sensor structure if desired, it will become apparent that a third chip is not required, in that a sealed cavity is not required for the sensor 110. A proof mass 120 for the sensor 110 is formed from the proof mass chip 112, which is preferably a bulk-micromachined silicon chip. The capping chip 114 forms a cap over the proof mass chip 112 sensor, thereby forming a cavity 124 between the chips 112 and 114. The capping chip 114 also forms an upper electrode of the sensor 110. While silicon is sufficiently conductive to enable the capping chip 114 to serve as an electrode for the sensor 110, it is foreseeable that a metal electrode could be formed by a metallization on the lower surface of the capping chip 114. If the capping chip 114 serves as the upper electrode, the mating surfaces of the chips 112 and 114 must be separated by a dielectric layer 134 in order to provide electrical isolation. Conventional wire bonding techniques can be employed to provide a conductor 138 that electrically interconnects the capping chip 114 with a suitable feedback control circuitry 136. As will be discussed below in greater detail, the control circuitry 136 provides for closed loop control of the proof mass 120 in order to achieve the desired force rebalance capability of the sensor 110.

In addition to forming the proof mass 120, the proof mass chip 112 defines a support frame 118 and a bridge 122 by which the proof mass 120 is cantilevered from the frame 118 within the cavity 124. Though the proof mass 112 is depicted as having a thickness of greater than the bridge 122 but less than the frame 118, it could be micromachined to have a significantly greater or lesser thickness if so desired. The bridge 122 preferably has a number of implanted piezoresistors 126 that are oriented so as to be able to sense strain in the bridge 122 when the proof mass 120 is deflected in a direction approximately perpendicular to the plane of the frame 118. Four piezoresistors 126 are typically employed, though it is foreseeable that more or fewer resistors could be used. In addition, it is foreseeable that other strain-sensing technologies could be used instead of the piezoresistors 126.

A thin film 128 is deposited on the upper surface of the bridge 122, and preferably on at least a portion of the upper surface of the proof mass 120, as shown in FIGS. 2 and 3. The thin film 128 serves to create an opposing biasing force that biases the proof mass 120 away from the capping chip 114, such that the proof mass 120 is deflected away from the capping chip 114 when the sensor 110 is de-energized, as depicted in FIG. 2. The thin film 128 can be a homogeneous material or a composite of multiple materials, and can be deposited as one or more layers. Deposition is conducted in a controlled manner such that the thin film 128 has a net compressive stress that is capable of achieving and maintaining the desired deflection of the proof mass 120. This effect of the net-compressive stress in the thin film 128 is to deflect the proof mass 120 downward from the capping chip 114 since the thin film 128 overlays the top surface of the bridge 122. Preferred materials for the thin film 128 are those capable of being deposited in controlled thicknesses and compositions, such that the deflection of the proof mass 120 will be predictable. Suitable materials for this purpose include silicon dioxide and silicon nitride.

Finally, an electrode 116 is formed on the proof mass 120, such that the electrode 116 faces the capping chip 114 across a gap formed by the cavity 124. As is conventional, the electrode 116 can be a metallization deposited on the proof mass 120 through a suitable mask. A connector 137 serves to electrically interconnect the electrode 116 with the feedback control circuitry 136. The continuous silicon of the frame 118, bridge 122 and proof mass 120 can serve as the conductor to the electrode 116.

The sensor 110 and its operation will be described below in terms of its use as an accelerometer, though the sensor 110 is generally capable of sensing any motion having a component in a direction approximately perpendicular to the plane of the sensor 110. As noted with the prior art sensor 10 of FIG. 1, the bridge 122 is subject to strains induced by the deflection of the proof mass 120 in response to acceleration forces. Specifically, if the proof mass 120 is deflected downward, away from the capping chip 114, the piezoresistors 126 are placed in tension, while an opposite deflection by the proof mass 120 places the piezoresistors 126 in compression. The capping chip 114 is energized by the control circuitry 136 to the extent necessary to generate an electrostatic force that attracts the proof mass 120 into a null position. It is preferable that the bridge 122 be free from strain when the sensor 110 is not subject to an acceleration force and the proof mass 120 is in the null position. Therefore, the null position for the proof mass 120 is preferably where the proof mass 120 is essentially parallel with the proof mass chip 112, as shown in FIG. 3, thereby removing the strain from the bridge 122 and bringing the resistances of the piezoresistors 126 to a level in which the output of the bridge 122 is calibrated as approximately zero.

The operation of the sensor 110 of this invention will now be discussed with reference to FIG. 3. When the sensor 110 is subjected to an acceleration force 132 having a component that is approximately perpendicular to the plane of the frame 114, the proof mass 120 is urged in an upward direction 130 toward the capping chip 114, causing the bridge 122 to bend in opposition to the biasing effect of the thin film 128. As a result, the upper surface of the bridge 122 is compressed, while its opposite surface is placed in tension. Because of the piezoresistive effect of the silicon crystal, the value of the resistances of the piezoresistors 126 will change.

The change in resistance of the piezoresistors 126 can be utilized by suitable circuitry, such as a Wheatstone bridge, within the control circuitry 136 that interprets the change in resistance as a level and direction of force on the proof mass 120. Based on this information, the control circuitry 136 instantaneously acts to reduce the applied potential to the capping chip 114, thereby reducing the electrostatic force 142 generated by the capping chip 114 and allowing the biasing force 140 generated by the thin film 128 to return the proof mass 120 to its null position. The control circuitry 136 seeks to return the output of the piezoresistors 126 to their level when the proof mass 120 was at null. The potential difference between the bias potential and that required to maintain the proof mass 120 at its null position is therefore proportional to the acceleration force 132, enabling its use as the output of the sensor 110.

If the sensor 110 is subjected to an acceleration force opposite to that shown in FIG. 3, the response of the system would be just the opposite. The upper surface of the bridge 122 would be placed in tension as the proof mass 120 is deflected away from the capping chip 114. In response, the control circuitry 136 would increase the applied potential to the capping chip 114, thereby generating a stronger electrostatic force that returns the proof mass 120 to its null position.

In accordance with the above, the sensor 110 operates in a closed loop that indicates the tendency of the proof mass 120 to move, instead of the amount of deflection by the proof mass 120. The output of the closed loop is the potential difference between the bias potential and that required to bring the proof mass 120 back to its null position, and is proportional to the acceleration force 132 applied to the proof mass 120. Therefore, the motion sensor 110 of this invention provides a piezoresistive accelerometer in a closed loop force rebalance application, enabling the stable and well defined piezoresistive sensing technology to be used in applications where a force rebalance sensor is desired. Furthermore, the motion sensor 110 achieves this capability while requiring a single-sided electrostatic force operating in opposition to a biasing force generated as a result of the manner in which the proof mass 120 is fabricated. Fabricating the sensor 110 so as to be initially deflected away from its null position enables the use of a single electrode to electrostatically bias the proof mass 120 to a null position when the sensor 110 is energized. The closed loop operation of the sensor 110 is such that the potential supplied to the electrode is increased or decreased from its bias position in response to accelerations in the same or opposite direction of the electrostatic force.

As a result, a significant advantage of the sensor 110 is that it does not require electrostatic balancing on both sides of the proof mass 120, but only on a single side of the proof mass 120. This aspect of the invention greatly simplifies the fabrication of the sensor 110 because only two electrical contacts are required within the sensor structure, making the sensor 110 more amenable to mass production methods. As such, the sensor 110 also does not require three separate chips. Only two chips are sufficient in the production of the sensor—a first 112 from which the proof mass 120 is fabricated, and a second 114 for precisely positioning the second electrode adjacent the proof mass 120—thereby decreasing material and manufacturing costs.

Another significant advantage is that the motion sensor 110 of this invention does not require that the proof mass 120 be enclosed within a sealed cavity, since the sensor 110 operates as a force rebalance sensor, and therefore does not require squeeze film air damping of the proof mass 120 in order to limit its response. Instead, the bandwidth for the sensor 110 can be electronically controlled with the control circuitry 136, with much tighter control than possible with the air damping of an open loop accelerometer. An additional advantage is that the operation of the motion sensor can be verified by confirming that the proof mass 120 moves to null when the bias voltage pre-established for attaining the null position is applied to the electrodes. Furthermore, avoidance of prior art squeeze film air damping techniques enables smaller gaps between the proof mass 120 and its surrounding structure, thereby allowing for full scale deflection of the proof mass 120 during power-up. Such a capability allows for a highly desirable self-test method that cannot be achieved with open loop squeeze film accelerometers and the fixed voltages available on an automobile.

The above advantages are achieved while retaining the primary advantageous operating characteristics of a piezoresistive accelerometer. Specifically, the strain sensing capability of the piezoresistors 126 yields a high degree of precision, and the piezoresistors 126 can be fabricated in a manner that is compatible with integrated circuit processing techniques. Furthermore, the sensitivity of piezoresistive technology permits the control circuitry 136 to be formed on a separate chip, with the potential for reducing the fabrication costs of the sensor 110.

The sensor 110 of this invention also retains the advantageous operating characteristics of a capacitive force rebalance sensor, in that the proof mass 120 is not required to move significantly in order to generate a suitable output. Such a configuration provides for a more durable sensor structure, since fatigue on the bridge 122 is significantly reduced and particulate contaminants that migrate into the cavity 124 are less likely to interfere with the operation of the sensor 110. In addition, the gap width between the proof mass 120 and the capping chip 114 is not required to be controlled to precise tolerances, since the steady-state voltage applied to the capping chip 114 can be readily adjusted in order to attract the proof mass 120 into a suitable null position. Finally, the use of the electronic control circuitry 136 can provide for a frequency response that is independent of the geometry of the sensor 110 and its proof mass 120.

While our invention has been described in terms of a preferred embodiment, it is apparent that other forms of the device could be adopted by one skilled in the art. For example, other transduction methods could be used to sense the strain in the bridge 122, including resonating beam, tunneling tip, capacitive and piezoresistive shear strain sensors, all of which are strain sensing elements known in the art.

Furthermore, those skilled in the art will appreciate that the sensor of this invention and its method for fabrication are equally applicable to other sensor configurations and other motion sensing applications. Accordingly, the scope of our invention is to be limited only by the following claims.

The embodiments of this invention in which an exclusive property or privilege is claimed are defined as follows:

1. A piezoresistive force rebalance motion sensor comprising:
   a cantilevered proof mass having a first electrode;
   a second electrode disposed adjacent the proof mass so as to form a gap between the second electrode and the first electrode, the second electrode being adapted to generate an electrostatic force that electrostatically attracts the proof mass in a direction toward the second electrode in an energized state of the second electrode;
   means associated with the proof mass for deflecting the proof mass in a direction away from the second electrode such that the proof mass is deflected away from the second electrode in absence of an electrostatic force on the proof mass;
   means for sensing strain induced by a deflection of the proof mass relative to the second electrode and for producing an output signal therefrom; and
   means for controlling the electrostatic force generated by the second electrode based on the output signal of the strain sensing means, the controlling means serving to return the proof mass to a null position relative to the second electrode when the proof mass is deflected from the null position;
   wherein the deflecting means counteracts the electrostatic force between the proof mass and the second electrode in the energized state, such that the proof mass to be maintained at the null position in the energized state.

2. A motion sensor as recited in claim 1 further comprising a silicon chip from which the proof mass is cantilevered.

3. A motion sensor as recited in claim 1 further comprising a silicon chip with which the second electrode is supported.

4. A motion sensor as recited in claim 1 further comprising a bridge by which the proof mass is cantilevered, wherein the deflecting means is disposed between the first electrode and the bridge.

5. A motion sensor as recited in claim 1 further comprising a bridge by which the proof mass is cantilevered, wherein the deflecting means is a thin film material on a surface of the bridge.

6. A motion sensor as recited in claim 1 wherein the null position of the proof mass is characterized by the proof mass being substantially parallel with the second electrode.

7. A motion sensor as recited in claim 1 wherein the strain sensing means comprises piezoresistors.

8. A motion sensor as recited in claim 1 wherein the gap between the first electrode of the proof mass and the second electrode is vented to atmosphere.

9. A motion sensor comprising:
   a first chip comprising a support frame, a bridge projecting from the support frame, and a proof mass suspended from the support frame by the bridge such that the proof mass is subject to input forces imposed on the motion sensor;
   a first electrode disposed on the proof mass;
   a second chip secured to the first chip, the second chip having a second electrode disposed adjacent the first electrode of the proof mass so as to form a gap therebetween, the second electrode being adapted to generate an electrostatic force that electrostatically attracts the proof mass toward the second chip in an energized state of the second electrode;
   means mounted on the bridge for deflecting the proof mass in a direction away from the electrode such that the proof mass is deflected away from the second electrode in absence of an electrostatic force on the proof mass;
   strain sensing means disposed on the bridge for sensing a deflection in the proof mass relative to the second electrode and producing an output signal therefrom; and
   means for controlling the electrostatic force generated by the second electrode based on the output signal of the strain sensing means, the controlling means serving to return the proof mass to a null position relative to the second chip when the proof mass is deflected from the null position;
   wherein the second electrode electrostatically attracts the proof mass toward the second chip and the deflecting means repels the proof mass away from the second chip in the energized state, such that the proof mass is maintained at the null position in the energized state.

10. A motion sensor as recited in claim 9 wherein the proof mass is cantilevered from the support frame.

11. A motion sensor as recited in claim 9 wherein the deflecting means is a thin film material on a surface defined by the bridge and the proof mass.

12. A motion sensor as recited in claim 9 wherein the null position of the proof mass is characterized by the proof mass being substantially coplanar with the first chip.

13. A motion sensor as recited in claim 9 wherein the strain sensing means comprises implanted piezoresistors in the bridge.

14. A motion sensor as recited in claim 9 wherein the gap between the first electrode of the proof mass and the second electrode of the second chip is vented to atmosphere.

15. A motion sensor as recited in claim 9 wherein the deflecting means is disposed between the first electrode and at least a portion of a surface defined by the bridge and the proof mass.

16. A piezoresistive force rebalance accelerometer comprising:
   a bulk-micromachined first chip comprising a support frame defining an aperture, a bridge projecting from the support frame, and a proof mass cantilevered within the aperture by the bridge such that the proof mass is subject to input forces imposed on the accelerometer;
   a first electrode disposed on a first surface of the proof mass;
   a second chip secured to the first chip so as to form with the first chip a cavity vented to atmosphere, the second chip having a second electrode disposed adjacent the first electrode of the proof mass so as to form a gap therebetween, the second electrode being adapted to generate an electrostatic force that electrostatically attracts the proof mass toward the second chip in an energized state of the second electrode;
   a thin film on the bridge and proof mass for deflecting the proof mass in a direction away from the second electrode such that the proof mass is deflected away from the second electrode in a absence of an electrostatic force on the proof mass;
   implanted piezoresistors in the bridge for sensing a deflection in the proof mass relative to the second electrode and producing an output signal therefrom; and
   means for controlling the electrostatic force generated by the second electrode based on the output signal of the piezoresistors, the controlling means serving to maintain the proof mass in a null position characterized by the proof mass being substantially coplanar with the first chip in the energized state;

whereby acceleration forces on the proof mass cause a change in the output signal of the piezoresistors, such that the controlling means causes a corresponding change in the electrostatic force generated by the second electrode and thereby returns the proof mass to the null position, such that the proof mass remains substantially at the null position while the second electrode is in the energized state.

17. A motion sensor as recited in claim 16 wherein the thin film is disposed between the first electrode and at least a portion of a surface defined by the bridge and the proof mass.

18. A motion sensor as recited in claim 16 wherein multiple thin films are provided on the bridge and the proof mass for deflecting the proof mass in a direction away from the second electrode.

* * * * *